United States Patent
Yoshimoto (10) Patent No.: US 7,961,576 B2
(45) Date of Patent: Jun. 14, 2011

(54) OPTICAL DISC DISCRIMINATING METHOD AND OPTICAL DISC APPARATUS

(75) Inventor: Tadafumi Yoshimoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 342 days.

(21) Appl. No.: 12/314,235

(22) Filed: Dec. 5, 2008

(65) Prior Publication Data

US 2009/0161511 A1    Jun. 25, 2009

(30) Foreign Application Priority Data

Dec. 19, 2007   (JP) .................................. 2007-326741

(51) Int. Cl.
*G11B 7/00* (2006.01)
(52) U.S. Cl. ..................... 369/53.22; 369/44.26; 369/94
(58) Field of Classification Search ............... 369/53.22, 369/47.27, 94, 44.25, 44.26, 53.23, 53.27, 369/53.28, 53.34
See application file for complete search history.

(56) References Cited

U.S. PATENT DOCUMENTS

| | | | |
|---|---|---|---|
| 5,710,749 A | 1/1998 | Tsukai et al. ................... | 369/58 |
| 6,711,103 B2 * | 3/2004 | Ueki ........................... | 369/44.27 |
| 7,139,229 B2 * | 11/2006 | Yamanoi et al. ............ | 369/53.22 |
| 7,149,169 B2 * | 12/2006 | Juan et al. ................... | 369/53.22 |
| 7,242,645 B2 * | 7/2007 | Takahashi et al. .......... | 369/44.29 |
| 7,492,685 B2 * | 2/2009 | Jodorkovsky et al. ..... | 369/53.22 |
| 7,746,747 B2 * | 6/2010 | Hasegawa ................... | 369/53.22 |
| 2007/0070849 A1 | 3/2007 | Saitoh et al. ................ | 369/53.22 |

FOREIGN PATENT DOCUMENTS

| | | |
|---|---|---|
| EP | 0 840 303 A2 | 5/1998 |
| JP | 11-134780 | 5/1999 |
| JP | 2006-277848 | 12/2006 |
| JP | 2007-095130 | 12/2007 |

\* cited by examiner

*Primary Examiner* — Nabil Z Hindi
(74) *Attorney, Agent, or Firm* — Morgan, Lewis & Bockius LLP (57) ABSTRACT

A detection signal is asserted when a surface of an optical disc or an information recording layer is detected. An asserting (masking) time interval of the detection signal is set such that the number of times of asserting the detection signal becomes at most two times when a focal position of the objective lens passes at least the surface of the optical disc. After the objective lens is moved for a prescribed section in a direction along which the objective lens comes closer to the optical disc, a kind of the optical disc is discriminated based on a time interval T1 from a first beginning of assertion to a second beginning of assertion, if the number of times of asserting the detection signal is two times, or based on a time interval which is a longer time interval between the time interval T1 from the first beginning of assertion to the second beginning of assertion and a time interval T2 from the second beginning of assertion to a third beginning of assertion if the number of times of asserting the detection signal is more than two times.

5 Claims, 5 Drawing Sheets

OPTICAL DISC DISCRIMINATING METHOD AND OPTICAL DISC APPARATUS

This application is based on Japanese Patent Application No. 2007-326741 filed on Dec. 19, 2007, and the contents of which are hereby incorporated by reference.

BACKGROUND OF THE INVENTION

1. Field of the Invention

The present invention relates to a method to discriminate a kind of an optical disc, and in particular, the present invention relates to a method to discriminate the kinds of the optical discs which have different thickness of a protecting layer to protect an information recording layer of the optical disc. Further, the present invention relates to an optical disc apparatus to which such optical disc discriminating method is applied.

2. Description of Related Art

Optical disc such as a compact disc (hereinafter referred to as a CD) and a digital versatile disc (hereinafter referred to as a DVD) are widely available from past. Further, optical disc which can record more large capacity of information, such as a Blu-ray disc (hereinafter referred to as a BD) and the like are developed recently for practical use. As a result, when reproducing or recording of the optical disc is performed by an optical disc apparatus, it is necessary to discriminate in advance what kind of the optical disc is loaded in the optical disc apparatus.

About a method to discriminate the kind of the optical disc, various kinds of technologies have been proposed heretofore. Among these technologies, there is a method to discriminate the kind of the optical disc based on difference of thickness of a protecting layer (it may also be referred to as a "transparent cover layer" or the like) which protects an information recording layer of the optical disc (See, JP-A-2007-095130, JP-A-2006-277848). When one example of them is shown, there is a method in which reflected light from surface of the optical disc and reflected light by the information recording layer are detected, difference of time interval between detection of the two reflected lights is measured, and the kind of the optical disc is judged based on it.

However, in the above described method which utilizes the difference of time interval between the detection of the reflection from the surface of the optical disc and the reflection by the information recording layer, a below described problem is caused. The detection of reflection from the surface of the optical disc or by the information recording layer is judged by result whether signal level of a prescribed signal which is obtained by processing of signal that is output from a photo detector, exceeds a prescribed threshold value, or not. However, there may be a case where chattering of signal happens when surface reflection or reflection by the information recording layer is detected, because of fluctuation of signal output from the photo detector, fluctuation of reflectance ratio of the optical disc, or the like. In such situation, there is a case where discrimination of the kind of the optical disc is not performed successfully.

SUMMARY OF THE INVENTION

In viewing the above described problem it is an object of the present invention to provide an optical disc discriminating method which can achieve correctly discrimination of kind of the optical disc for a plurality of kinds of optical discs that have different thickness of a protecting layer to protect an information recording layer of the optical disc. Further, another object of the present invention is to provide an optical disc apparatus to which such optical disc discriminating method is applied to achieve correctly the discrimination of kind of the optical disc.

To attain the above described object an optical disc apparatus in accordance with the present invention includes: a light source which is configured to irradiate an optical disc with a light beam; an objective lens which focuses the light beam that is emitted from the light source on an information recording layer of the optical disc; a photo detecting portion which receives reflected light that is emitted from the light source and reflected by the optical disc to perform photoelectric conversion; an actuator which moves the objective lens in a direction along which the objective lens comes closer to and goes away from the optical disc; a signal processing portion which processes signal that is output from the photo detecting portion; and a discriminating portion which discriminates kind of the optical disc that is loaded in the apparatus. And the optical disc apparatus is characterized in that when the kind of the optical disc is discriminated, the discriminating portion makes below process achieve; a step to move the objective lens for a prescribed section by the actuator in a state where the light beam is emitted from the light source, and a step to assert a detection signal which means detection of a surface of the optical disc or the information recording layer if a prescribed signal that is generated by the signal processing portion exceeds a prescribed threshold value while the objective lens is moved for the prescribed section, an asserting time interval of the detection signal is set such that the number of times of asserting the detection signal becomes at most two times when a focal position of the objective lens passes at least the surface of the optical disc or the information recording layer, and after the objective lens is moved for the prescribed section, the discriminating portion decides a moving time interval for the focal position of the objective lens to move between the surface of the optical disc and the information recording layer based on the detection signal, and discriminates the kind of the optical disc based on the moving time interval.

By this arrangement, an inventiveness is introduced in setting of the asserting time interval of the detection signal which means detection of the surface of the optical disc or the information recording layer. That is, the time interval is set such that the number of times of asserting the detection signal becomes at most two times when the focal position of the objective lens passes at least the surface of the optical disc or the information recording layer. As a result, a situation can be prevented where because the asserting time interval is too long when a first assertion of the detection signal is performed, a next assertion which should be generated normally cannot be obtained and detection of the surface of the optical disc or the information recording layer is missed. Further, even if a chattering of the signal is caused, there is no possibility that number of assertion of the detection signal becomes too many, and it can be prevented that a situation where moving time interval for the focal position of the objective lens to move between the surface of the optical disc and the information recording layer cannot be decided. As a result, in accordance with the present invention, discrimination of a plurality of kinds of the optical discs which have different thickness of the protecting layer to protect the information recording layer can be achieved correctly.

Further, after the objective lens is moved for the prescribed section, the discriminating portion may decide a time interval from a first beginning of assertion to a second beginning of assertion as the moving time interval, if the number of times of asserting the detection signal is two times, or may decide a time interval which is a longer time interval between the time interval from the first beginning of assertion to the second beginning of assertion and a time interval from the second beginning of assertion to a third beginning of assertion as the moving time interval if the number of times of asserting the detection signal is more than two times, in the optical disc apparatus structured as above described.

By this arrangement, even in a case where the number of times of asserting the detection signal becomes three times or more than two times which is normal number of times, the desired moving time interval can be decided by comparison of two time intervals. As a result, discrimination of the plurality of kinds of the optical discs which have different thickness of the protecting layer to protect the information recording layer, can be achieved without performing complicated processes.

Further, it is preferable that the asserting time interval of the detection signal is the same when the focal position of the objective lens passes the surface of the optical disc and when the focal position of the objective lens passes the information recording layer in the optical disc apparatus structured as above described.

By this arrangement, the same asserting time interval is employed when the focal position of the objective lens passes the surface of the optical disc and when the focal position of the objective lens passes the information recording layer. As a result, by the optical disc apparatus in accordance with the present invention, structure of the optical disc apparatus can be made in simple one without employing complicated control operations when the discrimination is achieved.

Still further, the photo detecting portion may have a plurality of divided photo receiving regions, and the prescribed signal may be a summed signal which is obtained by summing signals that are output from the plurality of photo receiving regions in the optical disc apparatus structured as above described.

By this arrangement, the prescribed signal is a signal that can be also obtained in a conventional optical disc apparatus. Therefore, the optical disc apparatus which can achieve properly the discrimination of a plurality of kinds of the optical discs that have different thickness of the protecting layer to protect the information recording layer can be obtained without introducing change of apparatus structure to the conventional structure to a large extent. As a result, rise of cost when the present invention is applied can be restrained.

Further, to attain the above described object an optical disc discriminating method in accordance with the present invention to discriminate a plurality of kinds of optical discs, each optical disc having the different thickness of a protecting layer that protects an information recording layer, the optical disc discriminating method includes: a step to move an objective lens which focuses a light beam that is emitted from a light source for a prescribed section in a direction along which the objective lens comes closer to or goes away from the optical disc in a state where the light beam is emitted from the light source; and a step to assert a detection signal which means detection of a surface of the optical disc or the information recording layer if a prescribed signal that is obtained based on light which is reflected by the optical disc exceeds a prescribed threshold value while the objective lens is moved for the prescribed section, and the method is characterized in that an asserting time interval of the detection signal is set such that the number of times of asserting the detection signal becomes at most two times when a focal position of the objective lens passes at least the surface of the optical disc or the information recording layer, and after the objective lens is moved for the prescribed section, a moving time interval for the focal position of the objective lens to move between the surface of the optical disc and the information recording layer is decided based on the detection signal, and the kind of the optical disc is discriminated based on the moving time interval.

By this arrangement, the inventiveness is introduced in setting of the asserting time interval of the detection signal which means detection of the surface of the optical disc or the information recording layer. That is, the time interval is set such that the number of times of asserting the detection signal becomes at most two times when the focal position of the objective lens passes at least the surface of the optical disc or the information recording layer. As a result, a situation can be prevented where because the asserting time interval is too long when a first assertion of the detection signal is performed, a next assertion which should be generated normally cannot be obtained and detection of the surface of the optical disc or the information recording layer is missed. Further, even if chattering of the signal is generated, there is no possibility that number of assertion of the detection signal becomes too many, and a situation can be prevented where moving time interval for the focal position of the objective lens to move between the surface of the optical disc and the information recording layer cannot be decided. As a result, in accordance with the present invention, discrimination of a plurality of kinds of the optical discs which have different thickness of the protecting layer to protect the information recording layer can be achieved correctly.

Still further, a time interval from a first beginning of assertion to a second beginning of assertion may be decided as the moving time interval, if the number of times of asserting the detection signal is two times, or a time interval which is a longer time interval between the time interval from the first beginning of assertion to the second beginning of assertion and a time interval from the second beginning of assertion to a third beginning of assertion may be decided as the moving time interval if the number of times of asserting the detection signal is more than two times in the optical disc discriminating method structured as above described.

By this arrangement, it becomes possible to properly achieve discrimination of a plurality of kinds of optical discs which have different thickness of the protecting layer to protect the information recording layer without performing complicated processes.

As above described, in accordance with the present invention, the optical disc discriminating method which can achieve correctly discrimination of a plurality of kinds of optical discs which have different thickness of the protecting layer to protect the information recording layer, can be provided. Further, in accordance with the present invention, the optical disc apparatus to which is applied such optical disc discriminating method and which can achieve correctly the discrimination of kind of the optical disc and has high reliability, can be provided.

DETAILED DESCRIPTION OF THE PREFERRED EMBODIMENTS

Hereinafter, an optical disc discriminating method in accordance with the present invention and an optical disc apparatus to which such discriminating method is applied will be explained in detail by way of embodiment.

First, gross structure of an optical disc apparatus to which an optical disc discriminating method in accordance with the present invention is applied will be explained.

Figure 1:
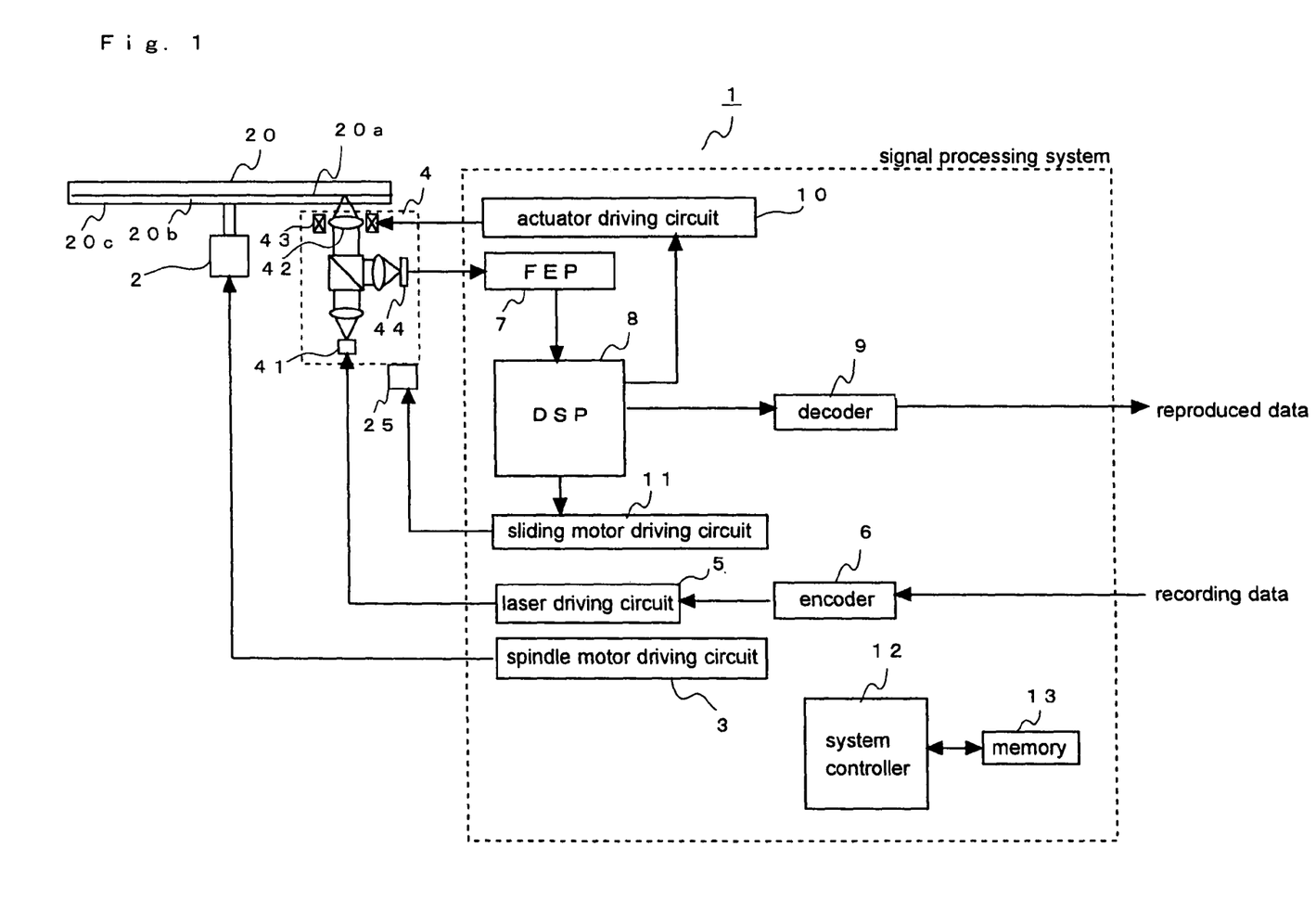
FIG. 1 is a block diagram to show structure of an optical disc apparatus according to the present embodiment.

FIG. 1 is a block diagram to show structure of an optical disc apparatus according to the present embodiment. The optical disc apparatus 1 according to the present embodiment is made capable of reproducing information recorded in an optical disc 20 and recording information on the optical disc 20. In the present embodiment, kinds of the optical discs 20 which can be reproduced and recorded is a BD, a DVD, and a CD.

A spindle motor 2 is connected to a turntable (not shown) to make the turntable rotatable. Further, the turntable holds the optical disc 20 in attachable and detachable manner. As a result, it is possible to rotate the optical disc 20 which is held on the turntable by rotating the spindle motor 2. Driving control of the spindle motor 2 is performed by a spindle motor driving circuit 3.

An optical pickup 4 is made to enable writing of information on the optical disc 20 or reading out of information which is recorded on the optical disc 20 by irradiating a laser beam that is emitted from a laser diode (light source) 41 onto the optical disc 20. As shown in FIG. 1, the optical pickup 4 is provided with the laser diode 41, an objective lens 42 which focuses the laser beam that is emitted from the laser diode 41 on an information recording layer 20a of the optical disc 20, an actuator 43 which makes the objective lens 42 movable in a focusing direction and a tracking direction, and a photo detector 44 which receives reflected light by the optical disc 20 and performs photoelectric conversion.

The focus direction is a direction along which the optical pickup 4 comes closer to or goes away from the optical disc 20, and it is a direction which is perpendicular to the information recording layer 20a of the optical disc 20 (in FIG. 1, corresponding to the vertical direction). Further, the tracking direction is a direction which is parallel to a radial direction of the optical disc 20 (in FIG. 1, corresponding to the horizontal direction).

The optical disc apparatus 1 according to the present embodiment is made capable of performing recording and reproducing of information for the BD, the DVD, and the CD, as above described. Therefore, the laser diode 41 is made to enable emitting laser beams which have wavelengths for the BD (for example, wavelength of 405 nm), a wavelength for the DVD (for example, wavelength of 650 nm) and a wavelength for the CD (for example, wavelength of 780 nm) by switching.

Further, the optical pickup 4 is made movable along the radial direction of the optical disc 20 (corresponding to the horizontal direction in FIG. 1) with driving by a sliding portion 40 to access any address of the optical disc 20. The sliding portion 40 is provided with, for example, a sliding motor, a pinion which is rotated by the sliding motor, and a rack (all of them are not shown) which is engaged with the pinion and is fixed on a base of the optical pickup 4 to move the optical pickup 4 utilizing relation between the rack and the pinion.

A laser driving circuit 5 performs, for the laser beam which is emitted from the laser diode 41 that is provided with the optical pickup 4, control of laser power utilizing amount of light which is received by a photo receiving element for front monitoring that is not shown, and control of switching when laser beam that has different wavelength is emitted. Further, when recording is performed, the laser driving circuit 5 receives recording signal which is input from outside and processed by an encoder 6 to make the laser diode 41 oscillate in compliance with the received signal.

The encoder 6 performs, for recording data which are received from outside, adding of an error correcting code (ECC) to encode utilizing a prescribed recording encoding method. Further, the encoder 6 generates pulse of recording (recording pulse) in compliance with a prescribed writing strategy from the signal which is encoded for recording. The term "writing strategy" means control rules for the recording pulse.

A front end processor (FEP) 7 is supplied with electric signal from the photo detector 44 which is included in the optical pickup 4. Then, the FEP performs various kinds of arithmetic processing, gain adjustment, elimination of noise, and the like for the supplied electric signal. To be more concrete, in the FEP 7, a reproduced RF signal, a focus error signal (FE signal), a tracking error signal (TE signal), a summed up signal (whose detail will be explained later), and the like are generated by the arithmetic processing. Then, these generated signals are performed gain adjustment and the like, and are output to a digital signal processor (DSP) 8 which will be described later. The FEP 7 is one embodiment of the signal processing portion of the present invention.

The DSP 8 performs analog-digital conversion (AD conversion) to a reproduced RF signal that is supplied from the FEP 7 to be synchronized with clock which is generated by a synchronizing signal generating circuit (not shown) which has circuit structure called a phase locked loop (PLL). The reproduced signal which is performed the AD conversion is output to a decoder 9.

The decoder 9 performs data demodulation and detects error in the data. When error is detected, the decoder 9 performs error correction process for the data if the error can be corrected. The reproduced data which is obtained by the decoder 9 is output to outside through, for example, an interface that is not shown in the drawing. The decoder 9 also plays a role to supply an error rate which is a rate of occurrence of reading error of the data, to a system controller 12.

The DSP 8 is provided with a servo control circuit, too. As a result, the DSP 8 controls driving of the actuator 43 through an actuator driving circuit 10 utilizing the FE signal and the TE signal which are output from the FEP 7 under control by the system controller 12 to perform the focus control and the tracking control. Further, the DSP 8 performs control of a sliding motor which is provided in the sliding portion 40 enabling moving of the optical pickup 4 in the radial direction. Further, the DSP 8 also controls driving of the actuator 43 through the actuator driving circuit 10 when discrimination of kind of the optical disc 20 is performed, when focus drawing is performed, or the like.

The actuator driving circuit 10 makes the actuator 43 drive such that focus of the objective lens 42 is always matched on the information recording layer 20a of the optical disc 20, in compliance with the focus control signal which is output from the servo controller circuit of the DSP 8. Further, the actuator driving circuit 10 makes the actuator 43 drive such that position of a light spot which is focused by the objective lens 42 always traces on a track of the optical disc 20 in compliance with the tracking control signal. Further, the actuator driving circuit 10 drives the actuator 43 by a signal from the DSP 8 when discrimination of kind of the optical disc 20 is performed, when focus drawing is performed, or the like.

A sliding motor driving circuit 11 controls driving of the sliding motor which is provided in the sliding portion 40 in compliance with a signal that is output from the DSP 8.

The system controller 12 is provided with a microprocessor and is connected with respective portions which compose the optical disc apparatus 1 through signal wires that are not shown to achieve proper control processing according to required operations which should be performed by the respective portions. Further, the system controller 12 obtains the summed up signal from the DSP 8 which will be described later. Though, detailed operation of the system controller 12 will be described later, it functions as a discriminating portion to discriminate kind of the optical disc 20 by utilizing a summed up signal.

To the system controller 12, a memory 13 is connected. In the memory 13, various parameters and operating programs and the like which are required for the system controller 12 to perform various operations, are stored.

Next, explanation will be given about the discriminating method of the optical disc 20 which is achieved by the optical disc apparatus 1 according to the present embodiment.

Figure 2:
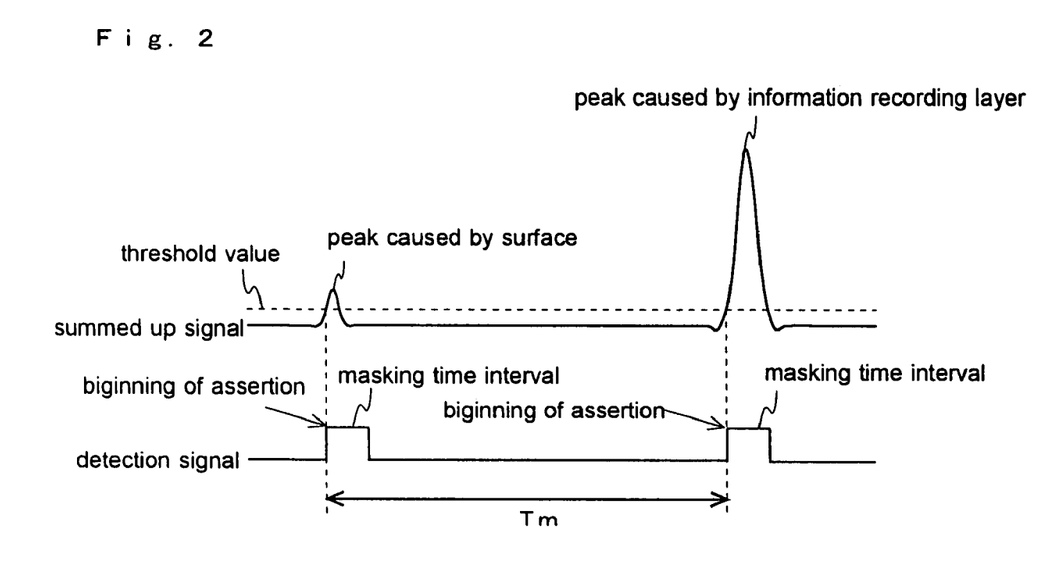
FIG. 2 is an explanatory diagram to explain essential principle of optical disc discriminating method which is achieved by the optical disc apparatus according to the present embodiment.

FIG. 2 is an explanatory diagram to explain essential principle of discriminating method of the optical disc 20 which is achieved by the optical disc apparatus 1 according to the present embodiment. A case is assumed where an objective lens 42 of the optical pickup 4 is moved from a position (position where a focal position of it is below a surface 20c of the optical disc 20) in a direction along which the objective lens 42 comes closer to the optical disc 20. In such case, the summed up signal shows two peaks as shown in FIG. 2 when the focal position of the objective lens 42 passes the surface 20c of the optical disc 20 and the information recording layer 20a.

Figure 3:
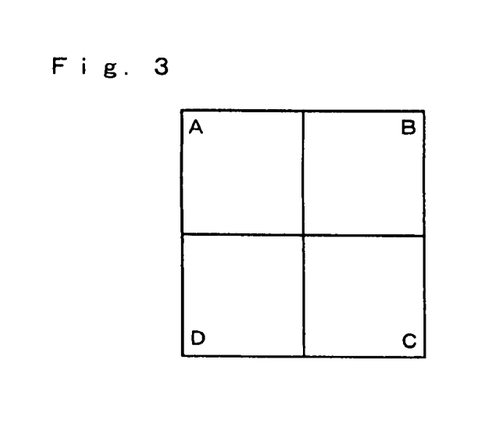
FIG. 3 is a diagram to explain structure of a photo detector which is provided in the optical disc apparatus according to the present embodiment.

At this time an explanation will be given about the summed up signal. In the photo detector 44 (See, FIG. 1) four divided regions A, B, C, D are formed as shown in FIG. 3. In the present embodiment, it is defined that a summed signal which is obtained by adding of signals that are output respectively from these four divided regions A, B, C, D is referred to as the summed up signal. This summed up signal changes its level of the signal in proportion to a light amount of reflected light from the optical disc 20. Then, the two peaks are obtained as shown in FIG. 2 because the light amount of reflected light becomes large when the focal position of the objective lens 42 passes the surface 20c of the optical disc 20 and the information recording layer 20a.

Figure 4:
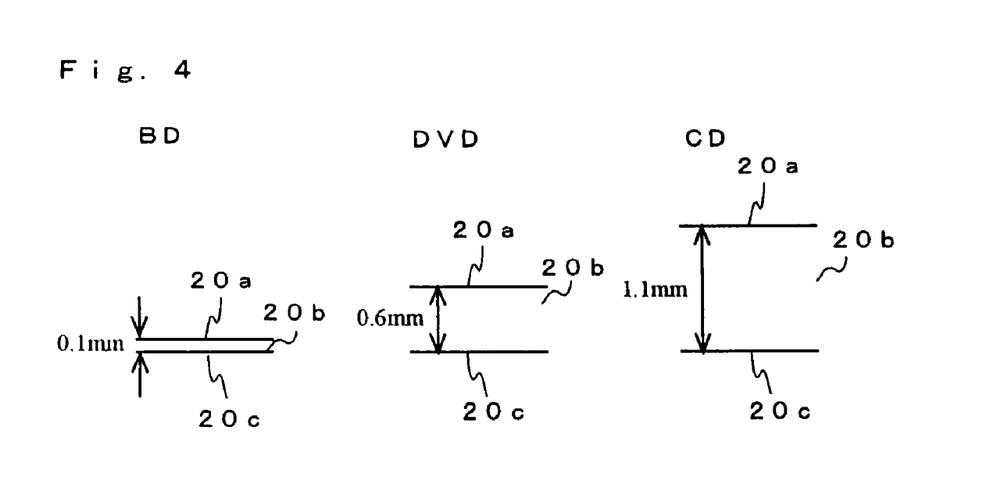
FIG. 4 is a schematic diagram to show structure of a BD, a DVD, and a CD.

FIG. 4 is a schematic diagram to show structure of a BD, a DVD, and a CD. As shown in FIG. 4, distance from the surface 20c of the optical disc 20 to the information recording layer 20a is different depending upon kind the respective optical discs 20. To be more concrete, thickness of a transparent cover layer 20b which protects the information recording layer 20a is different depending upon kind the respective optical discs 20. Thickness of the transparent cover layer 20b is, for example, 0.1 mm for the BD, 0.6 mm for the DVD, and 1.1 mm for the CD. Because of this, time length from when the peak caused by the surface 20c of the optical disc 20 is obtained to when the peak caused by the information recording layer 20a is obtained (See, FIG. 2 for both of them) is changed due to kind of the optical disc 20 if the objective lens 42 is moved in a constant speed pattern. Then, utilizing this fact, the kinds of the optical discs 20 can be discriminated.

To be more concrete, the kinds of the optical disc 20 can be discriminated as below, for example. As shown in FIG. 2, a threshold value with regard to a signal level of the summed up signal is set in advance. At this point the threshold value is set such that passage of the focal position of the objective lens 42 through the surface 20c of the optical disc 20 and the information recording layer 20a can be detected. If the threshold value is set too large, the surface 20c of the optical disc 20 and the information recording layer 20a cannot be detected. Further, if the threshold value is set too small, a signal caused by the surface 20c or the information recording layer 20a, and noise of signals cannot be distinguished. Taking into consideration of this point, the threshold value is set by a prior experiment.

The threshold value is set as above described, then the objective lens 42 is moved to come closer to the optical disc 20 in a constant speed pattern. Then, a detection signal is asserted at a time point when the signal level of the summed up signal exceeds the threshold value which is set in advance. This beginning of assertion means the detection of the surface 20c of the optical disc 20 or the information recording layer 20a. At this point, asserting time interval of the detection signal is made to stop in a prescribed time interval (hereinafter, this time interval is referred to as a "masking time interval"). It is because only surface 20c of the optical disc 20 can be detected when, for example, the objective lens 42 is moved coming closer to the optical disc 20 if the assertion state is continued.

A time interval of Tm from the beginning of assertion caused by the surface 20c of the optical disc 20 to the beginning of assertion caused by the information recording layer 20a is obtained. The time interval Tm is changed depending upon the distance from the surface 20c of the optical disc 20 to the information recording layer 20a. As a result, setting the prescribed threshold value ($\alpha$, $\beta$; which is decided by performing the experiment in advance) can discriminate kind of the optical disc 20 that is loaded in the optical disc apparatus 1 to be the BD, the DVD, or the CD. That is, it is possible to discriminate for the kinds of the optical discs 20, for example, in case of $Tm \leq \alpha$ the optical disc is the BD, in case of $\alpha < Tm \leq \beta$ the optical disc is the DVD, and in case of $\beta < Tm$ the optical disc is the CD.

Figure 5:
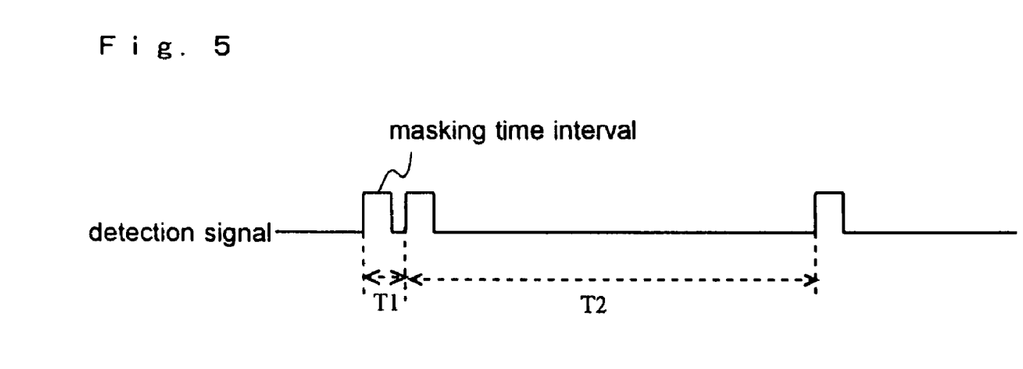
FIG. 5 is a schematic diagram to show one example a detection signal if chattering of signal is generated when discrimination of the optical disc is performed.

If structure is employed in which kind of the optical disc 20 is discriminated as above described, there is possibility that kind of the optical disc 20 is discriminated erroneously when chattering of the signal is generated. The chattering of the signal is generated by fluctuation of signal output from the photo detector 44, fluctuation of reflectance ratio of the optical disc 20, or the like. FIG. 5 is a schematic diagram to show one example a detection signal if chattering of signal is generated when discrimination of the optical disc 20 is performed. FIG. 5 shows a state where the chattering of the signal is generated when the surface 20c of the optical disc 20 is detected.

In case where the detection signal as shown in FIG. 5 is obtained, result is different based on the above described Tm (See, FIG. 2) being T1 or T2 in FIG. 5, for example. In case where T1 is selected as Tm, because T1 is the time interval between two detection signals which are caused by chattering of the signal, it is quite short time interval and it is smaller than the threshold value α. Therefore, it causes erroneous discrimination of the optical disc 20 when the kind of the optical disc 20 which is loaded in the optical disc apparatus 1 is the DVD or the CD. On the other hand, in case where T2 is selected as Tm, erroneous discrimination does not occur.

Influence of the chattering of the signal as above described tends to be larger when the masking time interval is short. The reason is that it is more possible that the detection signal is asserted two times or more by the chattering of the signal if the masking time interval is too short. As a result, it is preferable that the masking time interval is set long in a certain extent. However, when masking time interval is set too long, there is possibility that detection of the information recording layer 20a is failed in case where the objective lens 42 is moved in the direction that it comes closer to the optical disc 20 like the present embodiment. As a result, it is difficult to set simply the masking time interval long. In consideration of these points, in the discriminating method of the optical disc 20 which is achieved by the optical disc apparatus 1 according to the present embodiment, an inventive design as below described is introduced.

The influence of chattering can be reduced by setting the threshold value (See, FIG. 2) to judge the beginning of assertion of detection signal as high as possible. However, the threshold value cannot be set so much large because the peak of the summed up signal caused by the surface 20c of the optical disc 20 is small (for example, it is about one tenth of the peak caused by the information recording layer 20a). Therefore, there is a situation that the aforementioned chattering easily influences.

In the optical disc apparatus 1 according to the present embodiment, the masking time interval is set such that the number that the detection signal is asserted when the focal position of the objective lens 42 passes the surface 20c of the optical disc 20, becomes at most two. That is, the masking time interval is set such that the detection signal is asserted once in case where the chattering of the signal does not occur when surface 20c of the optical disc 20 is detected, and the detection signal is asserted only two times even in case where the chattering of the signal does occur when surface 20c of the optical disc 20 is detected. This masking time interval can be defined by prior experiment.

In case where the masking time interval is set as above described, because the masking time interval cannot become too long, there is no possibility that detection of the information recording layer 20a is missed. However, in this case, there is possibility that the number of times of asserting the detection signal becomes more than two which is expected normally (total two times: once when the focal position of the objective lens 42 passes the surface 20c, and once when the focal position of the objective lens 42 passes the information recording layer 20a). By this reason, there is possibility that discrimination of kind of the optical disc 20 is missed (for example, in the case shown in FIG. 5). As a result, the discrimination of kind of the optical disc 20 is achieved as below described.

FIG. 6A to FIG. 6D are schematic diagrams to show signal patterns of the detection signal which may be obtained in the optical disc apparatus 1 according to the present embodiment. At this point, FIG. 6A to FIG. 6D show cases that the objective lens 42 of the optical pickup 4 is moved for a prescribed section in the direction along which the objective lens 42 comes closer to the optical disc 20. The prescribed section is from a position where the focal position of the objective lens 42 is below the surface 20c of the optical disc 20 to a position where the focal position of the objective lens 42 is above the information recording layer 20a.

As one of the patterns which have possibility to be obtained, there may be a case where the detection signal is not asserted at a point in which the detection signal should be normally asserted because the surface 20c and/or the information recording layer 20a are missed to detect. However, such situation should be handled as a case where an error happens, and it is not considered in the present embodiment.

Figure 6A:
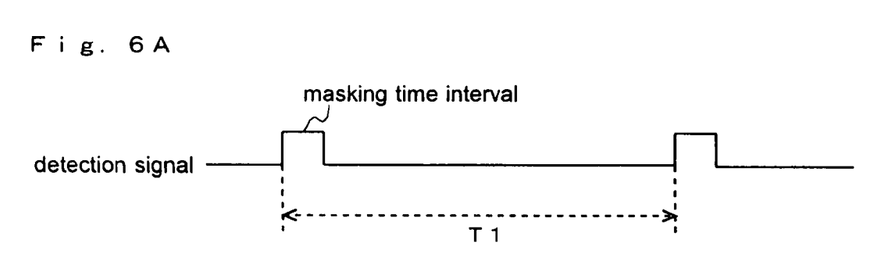
FIG. 6A is a schematic diagram to show a signal pattern of the detection signal which may be obtained in the optical disc apparatus according to the present embodiment in case where chattering of the signal is not generated at all.

FIG. 6A shows a pattern in case where the chattering of the signal is not generated at all. In this case, the detection signal is asserted once when the focal position of the objective lens 42 passes the surface 20c of the optical disc 20 and once when the focal position of the objective lens 42 passes the information recording layer 20a, respectively. Therefore, the time interval T1 from the first beginning of assertion to the second beginning of assertion can be decided as the moving time interval for the focal position of the objective lens 42 to move from the surface 20c of the optical disc 20 to the information recording layer 20a. As a result, in case where the number of times of asserting the detection signal is only two as shown in FIG. 6A when the objective lens 42 is moved for the prescribed section, the kind of the optical disc 20 is discriminated in comparison of T1 with the threshold values which are stored in advance (the above described α, β).

Figure 6B:
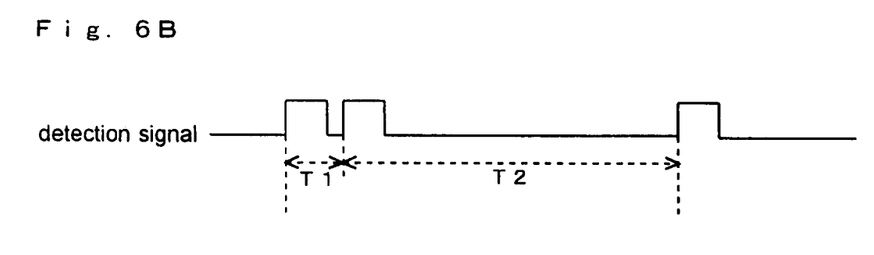
FIG. 6B is a schematic diagram to show the signal pattern of the detection signal which may be obtained in the optical disc apparatus according to the present embodiment in case where the chattering of the signal is generated only when surface of the optical disc is detected.

FIG. 6B shows a pattern in case where the chattering of the signal is generated only when surface 20c of the optical disc 20 is detected. In this case, the detection signal is asserted two times when the focal position of the objective lens 42 passes the surface 20c of the optical disc 20 and once when the focal position of the objective lens 42 passes the information recording layer 20a.

Figure 6C:
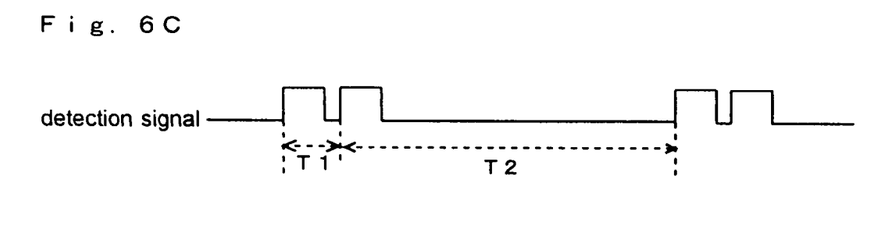
FIG. 6C is a schematic diagram to show the signal pattern of the detection signal which may be obtained in the optical disc apparatus according to the present embodiment in case where the chattering of the signal is generated when the surface of the optical disc is detected, and when an information recording layer is detected.

FIG. 6C shows a pattern in case where the chattering of the signal is generated when both of the surface 20c of the optical disc 20 and an information recording layer 20a are detected. In this case, the detection signal is asserted two times when the focal position of the objective lens 42 passes the surface 20c of the optical disc 20 and a plurality of times when the focal position of the objective lens 42 passes the information recording layer 20a. In the present embodiment, the masking time interval is set as the same time length for cases when the surface 20c of the optical disc 20 is detected and when the information recording layer 20a is detected. As a result, even in case where the chattering of the signal is generated when the information recording layer 20a is detected, the number of times of asserting the detection signal becomes also two times. However, it is no problem that structure is employed in which the masking time interval is different for cases when the surface 20c of the optical disc 20 is detected and when the information recording layer 20a is detected.

Figure 6D:
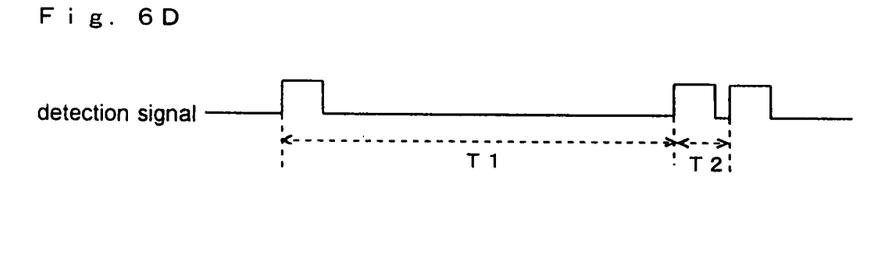
FIG. 6D is a schematic diagram to show the signal pattern of the detection signal which may be obtained in the optical disc apparatus according to the present embodiment in case where the chattering of the signal is generated only when the information recording layer of the optical disc is detected.

FIG. 6D shows a pattern in case where the chattering of the signal is generated only when the information recording layer 20a of the optical disc 20 is detected. In this case, the detection signal is asserted once when the focal position of the objective lens 42 passes the surface 20c of the optical disc 20 and a plurality of times (two times in the present embodiment) when the focal position of the objective lens 42 passes the information recording layer 20a.

As in the cases shown in FIG. 6B to FIG. 6D, if the number of times of asserting the detection signal becomes three times or more when the objective lens 42 is moved for the prescribed section, the moving time interval for the focal position of the objective lens 42 to move from the surface 20c of the optical disc 20 to the information recording layer 20a cannot be decided by the same manner as shown in FIG. 6A. Therefore, the time interval T1 from the first beginning of assertion to the second beginning of assertion and the time interval T2 from the second beginning of assertion to a third beginning of assertion are compared. Then, in the present embodiment, a longer time interval is selected and decided as the moving time interval for the focal position of the objective lens 42 to move from surface 20c of the optical disc 20 to the information recording layer 20a to discriminate the kind of the optical disc 20 (by the comparison with the above described threshold values $\alpha$, $\beta$).

The time interval for the detection signal to be asserted by the chattering of the signal, is very short. As a result, the moving time interval for the focal position of the objective lens 42 to move from the surface 20c of the optical disc 20 to the information recording layer 20a can be decided by comparing time length of the time interval T1 and the time interval T2, and selecting the longer one as above described. In case where this structure is employed, there is possibility that an accurate time interval for the focal position of the objective lens 42 to move from the surface 20c of the optical disc 20 to the information recording layer 20a cannot be obtained. However, because the time interval for the detection signal to be asserted by the chattering of the signal is very short, the kind of the optical disc 20 can be accurately discriminated by setting of the threshold values $\alpha$, $\beta$ though the above described time interval is not accurate.

Figure 7:
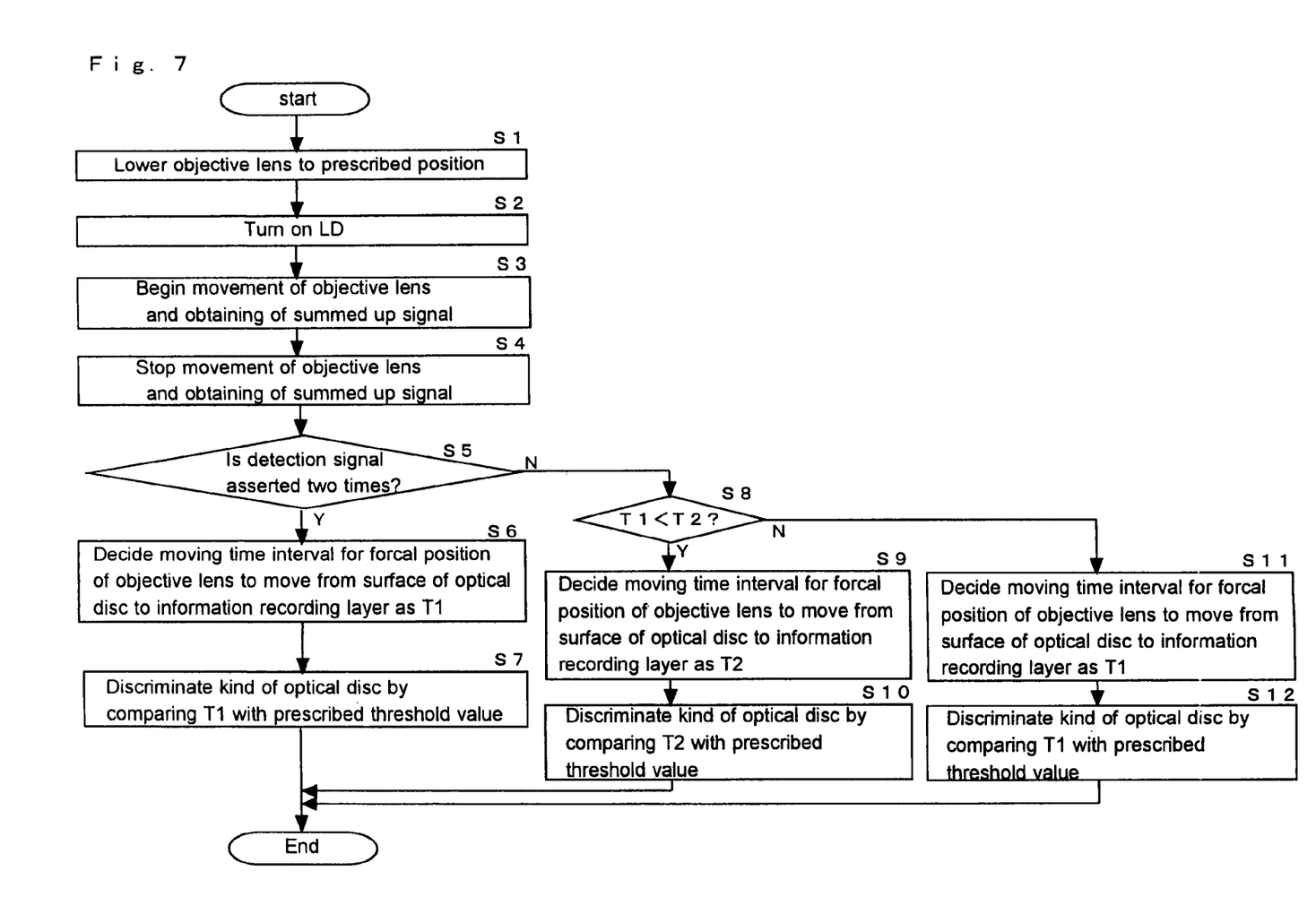
FIG. 7 is a flowchart to show a flow for discriminating kind of the optical disc by the optical disc apparatus according to the present embodiment.

Next, explanation will be given about a flow to discriminate the kind of the optical disc by the optical disc apparatus 1 according to the present embodiment with reference to FIG. 7.

When a command is output from a system controller 12 (See, FIG. 1) to achieve the discrimination of the kind of the optical disc 20, the objective lens 42 is lowered to a prescribed position (step S1). The prescribed position in this step is a position where the focus position of the objective lens 42 becomes enough lower than the surface 20c of the optical disc 20.

Next, the laser diode (LD) 41 is turned on (step S2). It is no problem that any wavelength of the laser light is emitted from the laser diode 41 among the wavelengths that can be emitted from the laser diode 41. However, if any wavelength of the laser light is emitted, there may be a case where the desired peak of the summed up signal is not obtained when an operation which will be described later is performed. In such case, it is no problem that structure is employed in which three laser beams that can be emitted from the laser diode 41 and have different wavelengths are emitted in sequence, the operation which will be described later is performed for every laser beam, and kind of the optical disc is discriminated finally.

When the laser diode 41 is turned on, the objective lens 42 is started to move in the direction along which the objective lens 42 comes closer to the optical disc 20. And at the same time, obtaining of the summed up signal is started (step S3). At this time point, the objective lens 42 is moved in a constant speed pattern that is set in advance. Further, time measurement is also performed as well as the obtaining of the summed up signal. In addition, the system controller 12 asserts the detection signal for the masking time interval which is set in advance when level of the obtained summed up signal exceeds a threshold value (See, FIG. 2) for the signal level that is stored in the memory 13 in advance.

When the objective lens 42 is moved to the prescribed position while the above described operations are performed, movement of the objective lens 42 and obtaining of the summed up signal are stopped (step S4). The prescribed position in this step is a position where the focus position of the objective lens 42 becomes enough higher than the information recording layer 20a of the CD which has the thickest transparent cover layer 20b.

Next, the system controller 12 confirms whether the obtained detection signal is asserted two times or not (step S5). In case where it is asserted two times, because the situation described in FIG. 6A is realized, time interval T1 from the first beginning of assertion to the second beginning of assertion is decided as the moving time interval for the focal position of the objective lens 42 to move from the surface 20c of the optical disc 20 to the information recording layer 20a (step S6). Then, discrimination of kind of the optical disc 20 is achieved by comparing the decided moving time interval T1 with the threshold values $\alpha$, $\beta$ which are, stored in the memory 13 in advance for discrimination of kind of the optical disc 20.

On the other hand, in case where it is asserted more than two times (three or more), the time interval T1 from the first beginning of assertion to the second beginning of assertion and the time interval T2 from the second beginning of assertion to the third beginning of assertion are compared. To be more concrete, it is confirmed whether T1 is smaller than T2 (T1<T2) (step S8).

In case where T1 is smaller than T2 (that is, T1<T2) (situations shown in FIG. 6B and FIG. 6C), the time interval T2 which is longer one is decided as the moving time interval for the focal position of the objective lens 42 to move from the surface 20c of the optical disc 20 to information recording layer 20a (step S9). Then, discrimination of kind of the optical disc 20 is achieved by comparing the decided moving time interval T2 with the threshold values $\alpha$, $\beta$ which are stored in the memory 13 in advance for discrimination of kind of the optical disc 20 (step S10).

On the other hand in case where T1 is not smaller than T2 (that is, T1>T2) (situations shown in FIG. 6D), the time interval T1 which is longer one is decided as the moving time interval for the focal position of the objective lens 42 to move from surface 20c of the optical disc 20 to information recording layer 20a (step S11). Then, discrimination of kind of the optical disc 20 is achieved by comparing the decided moving time interval T1 with the threshold values $\alpha$, $\beta$ which are stored in the memory 13 in advance for discrimination of kind of the optical disc 20 (step S12).

By the method as above described, the discrimination of kind of the optical disc 20 can be properly achieved even when the chattering of the signal is generated. As a result, it can be said that the optical disc apparatus 1 according to the present embodiment is a high reliable optical disc apparatus.

(Others)

The above described embodiment is mere an example and the present invention is not limited to the above described embodiment, and various modification can be introduced within a scope of the object of the present invention.

In the above described embodiment, structure is employed in which the discrimination of kind of the optical disc 20 is achieved by performing operation that the objective lens 42 is moved in the direction along which the objective lens comes closer to the optical disc 20. However, the present invention is not limited to the structure and it is no problem that structure is employed in which the discrimination of kind of the optical disc 20 is achieved by performing operation that the objective lens 42 is moved in the direction along which the objective lens goes away from the optical disc 20. In such case the information recording layer 20a and the surface 20c of the optical disc 20 are detected in this order, and the masking time interval is set such that number of times of asserting the detection signal becomes at most two times when the focal position of the objective lens 42 passes at least the information recording layer 20a of the optical disc 20.

Further, in the above described embodiment, structure is employed in which the discrimination of kind of the optical disc 20 is achieved by utilizing the summed up signal, however, the present invention is not limited to the structure. That is, it is no problem that structure is employed in which, for example, an S character curve of a focus error signal is utilized.

Still further, in the above described embodiment, the discriminating method is shown in case where the kind of the optical disc 20 for which the optical disc apparatus 1 can perform reproducing and recording of information are the BD, the DVD, and the CD. However, the present invention is not intended to be limited to these optical discs, and the present invention can be widely applied to the discrimination for a plurality of kinds of optical discs 20 which have different thickness of the transparent cover layer (protecting layer) 20b that protects the information recording layer 20a.

Still further, in the above described embodiment, structure is employed in which the optical disc apparatus 1 can perform reproducing and recording of information. However, the present invention can be applied to an optical disc apparatus which can only reproduce information, of course.

In accordance with the present invention, the kind of the optical disc can be correctly discriminated for a plurality of kinds of optical discs which have different thickness of the protecting layer that protects the information recording layer. As a result, the present invention is useful in industry.

What is claimed is:

1. An optical disc apparatus comprising:
   a light source that is configured to irradiate an optical disc, loaded in the apparatus, with light beams having different wavelengths;
   an objective lens that focuses the light beams from the light source on an information recording layer of the optical disc;
   a photo detecting portion that receives reflected light from the optical disc to perform photoelectric conversion;
   an actuator that moves the objective lens in a focusing direction;
   a signal processing portion that processes a signal that is output from the photo detecting portion to generate a summed up signal; and
   a discriminating portion that discriminates kind of the optical disc by asserting a detection signal at a time point when a signal level of the summed up signal exceeds a prescribed threshold value, wherein
   when the detection signal is asserted two times, a time interval for a focal position of the objective lens to move from a surface of the optical disc to the information recording layer is decided as a moving time interval, the kind of the optical disc is discriminated by comparing the moving time interval with the prescribed threshold value,
   when the detection signal is asserted three times or more, a time interval from a first beginning of assertion to a second beginning of assertion, and a time interval from the second beginning of assertion to a third beginning of assertion are compared to decide a longer time interval, such that the kind of the optical disc is discriminated by comparing the longer time interval with the prescribed threshold value.

2. The optical disc apparatus according to claim 1, wherein the asserting time interval of the detection signal is the same when the focal position of the objective lens passes the surface of the optical disc and when the focal position of the objective lens passes the information recording layer.

3. The optical disc apparatus according to claim 1, wherein the photo detecting portion has a plurality of divided photo receiving regions, and the summed signal is obtained by summing signals that are output from the plurality of photo receiving regions.

4. The optical disc apparatus according to claim 2, wherein the photo detecting portion has a plurality of divided photo receiving regions, and the summed signal is obtained by summing signals that are output from the plurality of photo receiving regions.

5. A optical disc discriminating method to discriminate a plurality of kinds of optical discs, each optical disc having the different thickness of a protecting layer that protects an information recording layer, the optical disc discriminating method comprising:
   moving an objective lens that focuses a light beam that is emitted from a light source for a prescribed section in a direction along which the objective lens comes closer to or goes away from the optical disc in a state where the light beam is emitted from the light source; and
   asserting a detection signal that means detection of a surface of the optical disc or the information recording layer if a prescribed signal that is obtained based on light which is reflected by the optical disc exceeds a prescribed threshold value while the objective lens is moved for the prescribed section, wherein
   when the detection signal is asserted two times, a time interval for a focal position of the objective lens to move from the surface of the optical disc to the information recording layer is decided as a moving time interval, the kind of the optical disc is discriminated by comparing the moving time interval with the prescribed threshold value, and
   when the detection signal is asserted three times or more, a time interval from a first beginning of assertion to a second beginning of assertion, and a time interval from the second beginning of assertion to a third beginning of assertion are compared to decide a longer time interval, so that the kind of the optical disc is discriminated by comparing the longer time interval with the prescribed threshold value.

* * * * *